(12) United States Patent
Shaver et al.

(10) Patent No.: US 10,792,898 B2
(45) Date of Patent: Oct. 6, 2020

(54) VACUUM SKIN PACKAGE WITH EASY-OPEN/RECLOSABLE BOTTOM WEB

(71) Applicant: Cryovac, Inc., Charlotte, NC (US)

(72) Inventors: Vivian Ann Shaver, Lyman, SC (US); Michael J. Rosinski, Greer, SC (US); Lee Conrad Reviere, Spartanburg, SC (US); Laurie Joy Ballenger, Greer, SC (US)

(73) Assignee: Cryovac, LLC, Charlotte, NC (US)

( * ) Notice: Subject to any disclaimer, the term of this patent is extended or adjusted under 35 U.S.C. 154(b) by 113 days.

(21) Appl. No.: 15/573,595

(22) PCT Filed: May 5, 2016

(86) PCT No.: PCT/US2016/030881
§ 371 (c)(1),
(2) Date: Nov. 13, 2017

(87) PCT Pub. No.: WO2016/182831
PCT Pub. Date: Nov. 17, 2016

(65) Prior Publication Data
US 2018/0104939 A1 Apr. 19, 2018

Related U.S. Application Data

(60) Provisional application No. 62/159,402, filed on May 11, 2015.

(51) Int. Cl.
*B32B 7/06* (2019.01)
*B32B 7/12* (2006.01)
(Continued)

(52) U.S. Cl.
CPC ............ *B32B 27/08* (2013.01); *B32B 7/06* (2013.01); *B32B 7/12* (2013.01); *B32B 27/32* (2013.01);
(Continued)

(58) Field of Classification Search
CPC ............ B65D 77/2096; B65D 81/2015; B65D 75/305
See application file for complete search history.

(56) References Cited

U.S. PATENT DOCUMENTS

| 3,754,372 A | 8/1973 | Perdue |
|---|---|---|
| 5,050,736 A | 9/1991 | Griesbach et al. |

(Continued)

FOREIGN PATENT DOCUMENTS

| EP | 1714907 | 10/2006 |
|---|---|---|
| EP | 1857270 | 11/2007 |

(Continued)

*Primary Examiner* — Mollie Impink
(74) *Attorney, Agent, or Firm* — Jason R. Womer

(57) ABSTRACT

An easy-open/reclosable vacuum skin package includes a bottom web, a product, and a top web; the bottom web includes a laminate having a shaped die-cut, and a label overlying the die-cut, and adhered to the laminate, such that when the label is peeled back, a portion of the laminate is peeled back, opening the package, and the package can be reclosed by returning the label to its original position on the laminate. A method of making an easy-open/reclosable vacuum skin package includes providing a bottom web; disposing a product on the bottom web; providing a thermoformable top web; and advancing the product through a VSP process to make a package in which the top web is in contact with and conformed to the product; the bottom web including a laminate having a die-cut, and a label overlying the die-cut, and adhered to the laminate.

16 Claims, 4 Drawing Sheets

(51) Int. Cl.
   *B65D 75/58*   (2006.01)
   *B65D 25/06*   (2006.01)
   *B32B 27/08*   (2006.01)
   *B32B 27/32*   (2006.01)
   *B32B 27/34*   (2006.01)
   *B32B 27/36*   (2006.01)
   *B65D 75/30*   (2006.01)
   *B65B 25/06*   (2006.01)
   *B65B 31/00*   (2006.01)
   *B65B 61/18*   (2006.01)

(52) U.S. Cl.
   CPC .............. *B32B 27/34* (2013.01); *B32B 27/36* (2013.01); *B65B 25/06* (2013.01); *B65B 31/00* (2013.01); *B65D 75/305* (2013.01); *B65D 75/5838* (2013.01); *B32B 2307/31* (2013.01); *B32B 2307/7244* (2013.01); *B32B 2307/738* (2013.01); *B32B 2439/40* (2013.01); *B32B 2439/70* (2013.01); *B65B 61/184* (2013.01); *B65D 2401/55* (2020.05)

(56) References Cited

U.S. PATENT DOCUMENTS

| | | | | |
|---|---|---|---|---|
| 5,409,116 | A * | 4/1995 | Aronsen | B65B 5/022 |
| | | | | 206/484 |
| 5,846,582 | A * | 12/1998 | Mayfield | B65D 75/305 |
| | | | | 426/129 |
| 6,428,867 | B1 * | 8/2002 | Scott | B32B 27/08 |
| | | | | 206/807 |
| 2002/0172834 | A1 * | 11/2002 | Rivett | B32B 27/08 |
| | | | | 428/515 |
| 2003/0215162 | A1 | 11/2003 | Switlik et al. | |
| 2009/0311454 | A1 * | 12/2009 | Stephens | B32B 7/12 |
| | | | | 428/35.7 |

FOREIGN PATENT DOCUMENTS

| | | |
|---|---|---|
| WO | 9639341 | 12/1996 |
| WO | 9954398 | 10/1999 |

* cited by examiner

VACUUM SKIN PACKAGE WITH EASY-OPEN/RECLOSABLE BOTTOM WEB

CROSS-REFERENCE TO RELATED APPLICATIONS

This application claims the benefit of and priority from U.S. Provisional Application No. 62/159,402 filed May 11, 2015.

FIELD OF THE INVENTION

This invention relates to a vacuum skin package with an easy-open/reclosable bottom web, and a method of making the package.

BACKGROUND

Vacuum skin packaging (VSP) can be viewed as a vacuum forming process for thermoformable polymeric films. The product to be packaged, disposed on a supporting member such as a tray or a rigid, semi-rigid, or flexible bottom web, serves as the mold for the thermoformable film which is formed about the product by means of vacuum and/or differential air pressure and heating of the thermoformable film.

In conventional skin packaging, a backing board which is porous or which is perforated so that a vacuum may be drawn directly through the backing board is employed. In VSP processes generally a vacuum chamber with an open top is used. The product on an impervious backing board is placed on a platform within the vacuum chamber. The top of the chamber is covered by a sheet of film which is clamped tightly against the chamber to form a vacuum tight closure. The chamber is evacuated while the film is heated to its forming and softening temperature. The platform is then raised to drive the product into the softened film and air pressure can be used above the film to force it tightly around the product.

In a variant of this process, after the chamber has been evacuated and the product driven into the heat softened film, the vacuum is released and ambient air is permitted to enter the chamber so that the thermoplastic film molds more or less onto the product.

Alternatively, a VSP process can be employed in which an article to be packaged is inserted within the lower half of a vacuum chamber on a backing board, a thermoplastic film is placed over the open face of the lower half of the chamber, the chamber is closed and both halves are brought to essentially the same state of vacuum, the film is heated and softened, and then atmospheric air is introduced into the upper half of the chamber so that it alone forces the thermoplastic film down around the product and against the backing board.

Alternatively, heat softened film is physically moved down over a stationary product and, in connection with air pressure, the softened thermoplastic film is molded onto the product.

VSP packaging is described In U.S. Pat. No. RE30,009 (Perdue et al.), incorporated herein by reference in its entirety.

There is need in the marketplace for a packaging arrangement whereby a bottom web for a VSP package can be produced by a supplier of web material, that can be used in a manner that requires little or no modification to the food packager's packaging equipment, while providing an easily openable (i.e. by hand, without the need for tools such as scissors or knives), as well as reclosable feature.

SUMMARY

In a first aspect, an easy-open/reclosable vacuum skin package comprises a bottom web; a product disposed on the bottom web; and a top web in contact with and conformed to the shape of at least a portion of the product; wherein the bottom web comprises a laminate having a shaped die-cut, and a label overlying the shaped die-cut, and adhered to the laminate; the package configured such that when the label is peeled back, a portion of the laminate is also peeled back, opening the package, and the package can thereafter be reclosed by returning the label to substantially its original position on the laminate.

In a second aspect, a method of making an easy-open/reclosable vacuum skin package comprises providing a bottom web; disposing a product on the bottom web; providing a thermoformable top web; and advancing the product through a vacuum skin packaging process to make a package in which the top web is in contact with and conformed to the shape of at least a portion of the product; wherein the bottom web comprises a laminate having a shaped die-cut, and a label overlies the shaped die-cut, and is adhered to the laminate; the package configured such that when the label is peeled back, a portion of the laminate is also peeled back, opening the package, and the package can thereafter be reclosed by returning the label to substantially its original position on the laminate.

BRIEF DESCRIPTION OF THE DRAWINGS

The present invention is illustrated by reference to the following drawings, encompassing different views of various embodiments of the invention, wherein.

DETAILED DESCRIPTION

Illustrative Embodiment

Figure 1:
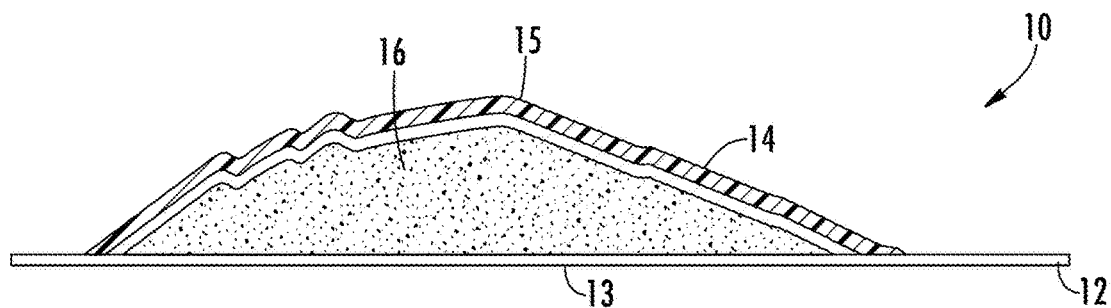
FIG. 1 is a cross-sectional, elevational view of a vacuum skin package.
Figure 2:
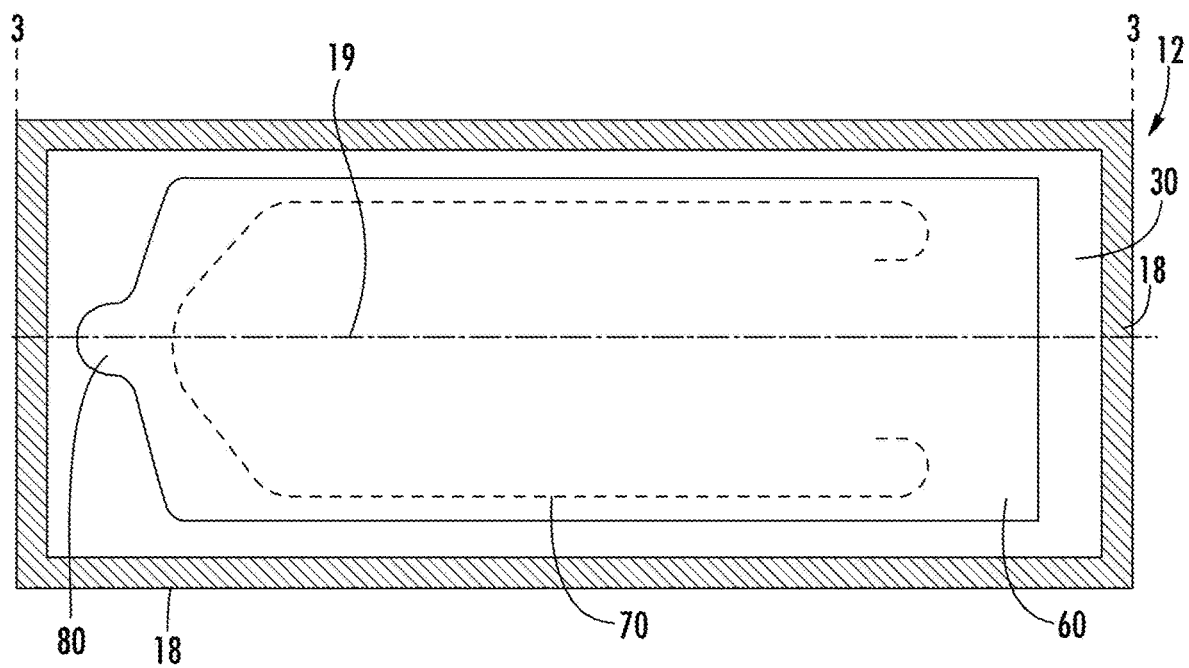
FIG. 2 is a bottom view of a vacuum skin package.
Figure 3:
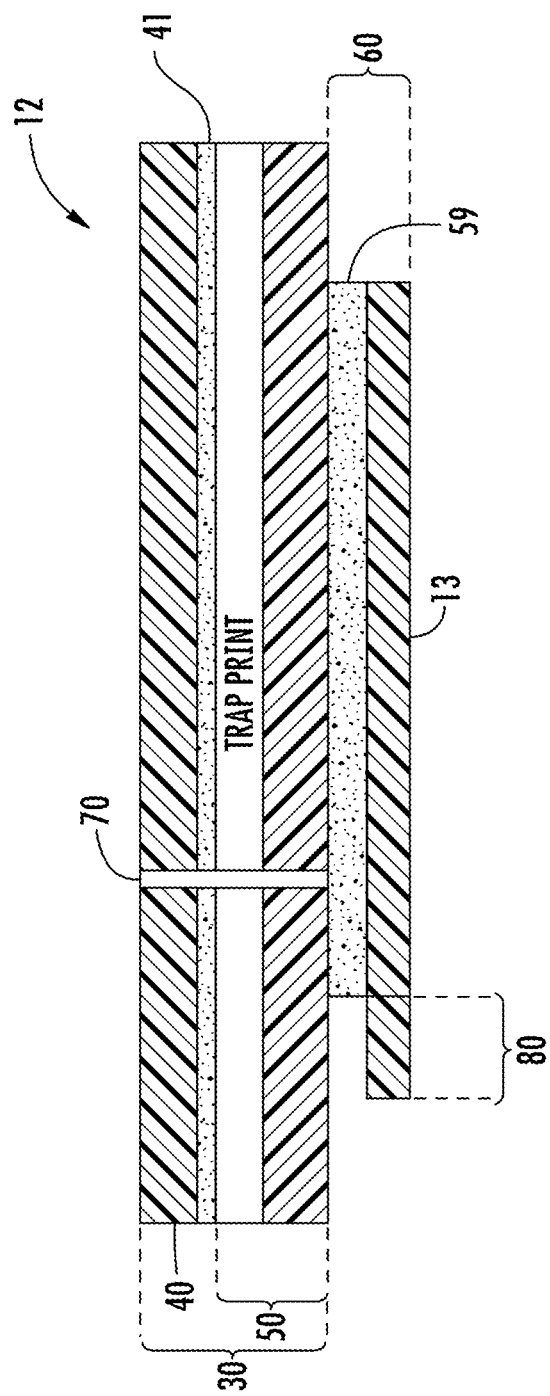
FIG. 3 is a cross-sectional view of the bottom web.

The invention comprises a VSP package that includes a bottom web 12 as shown in FIG. 1, FIG. 2 and FIG. 3 having an easy open/reclosable functionality. This functionality is provided by using, as a bottom web, a laminate 30 having a substrate film 40 and a support web 50. The laminate 30 typically includes an oxygen barrier as part of either or both of the substrate film and the support web. The laminate includes a shaped die-cut 70. The bottom web also includes a label 60 to which a pressure sensitive adhesive (PSA) 59 is applied. The label 60 is smaller in dimension than the underlying laminate 30.

"Die cut" or "die-cut" herein refers to a through cut or score, done by conventional methods including rotary die, steel rule die, laser, and platen die cutting.

"Ethylene/alpha-olefin copolymer" (EAO) herein refers to copolymers of ethylene with one or more comonomers selected from $C_3$ to $C_{10}$ alpha-olefins, and includes such heterogeneous materials as linear medium density polyethylene (LMDPE), linear low density polyethylene (LLDPE), and very low and ultra low density polyethylene (VLDPE and ULDPE), homogeneous ethylene/alpha olefin copolymers (HEAO), and multicomponent ethylene/alpha-olefin interpenetrating network resin.

"Ethylene homopolymer or copolymer" herein refers to ethylene homopolymer such as low density polyethylene (LDPE), medium density polyethylene (MDPE), high density polyethylene (HDPE); EAO; ethylene/vinyl acetate copolymer (EVA); ethylene/alkyl acrylate copolymer; ethylene/(meth)acrylic acid copolymer; or ionomer resin.

"Film" is used herein to mean a film, laminate, or web, either multilayer or monolayer, that may be used in connection with the present invention.

"Oxygen barrier" and the like herein refers to materials having an oxygen permeability, of the barrier material, less than 500 cm$^3$ O$_2$/m$^2$·day·atmosphere (tested at 1 mil thick and at 25° C., 0% RH according to ASTM D3985), such as less than 100, less than 50, less than 25, less than 10, less than 5, and less than 1 cm$^3$ O$_2$/m$^2$·day·atmosphere. Examples of polymeric materials useful as oxygen barrier materials are ethylene/vinyl alcohol copolymer (EVOH), polyvinylidene dichloride (PVDC), vinylidene chloride/methyl acrylate copolymer, vinylidene chloride/vinyl chloride copolymer, polyamide, and polyester.

"Pressure sensitive adhesive" (PSA) herein refers to an adhesive that bonds firmly with the application of light pressure. It adheres to most surfaces with very slight pressure; is available in solvent and latex or water based forms, and is often based on non-crosslinked rubber adhesives, acrylics, or polyurethanes. They are available in a wide variety of chemical compositions and systems including acrylic and methacrylate adhesives, rubber-based pressure sensitive adhesives, styrene copolymers (styrene/isoprene/styrene and styrene/butadiene/styrene block copolymers), and silicones. In some embodiments, hot melt adhesives may be useful as well, are included herein for those embodiments as "PSA"; a hot melt adhesive is a thermoplastic adhesive compound, usually solid at room temperature which becomes fluid on heating for use.

"Score", "scoring" or the like herein refers to a type of die-cut that does not extend entirely through the relevant layer or film, made e.g. by a laser. Thus, a score by definition leaves intact a certain amount of material in the area of this type of die-cut.

"Tamper evidence" and the like herein refers to a breach in a package; i.e. that someone has accidentally or intentionally opened or partially opened the package, or attempted to do so; and visual evidence of such a breach.

"Web" herein refers to a film, made at least in part from a thermoplastic multilayer material, that functions as a bottom or top web, or component thereof, of a VSP package. Webs are typically supplied to a food processor in a lay flat form, rolled onto a roll.

All compositional percentages used herein are presented on a "by weight" basis, unless designated otherwise.

In one embodiment, the substrate film includes a coextruded barrier film having a core layer of EVOH, tie layers astride the core layer, and bulk layers that bond the tie layers to an outer layer and an inner sealant layer respectively, the outer and inner layers comprising an olefinic polymer or copolymer. Thus a coextruded layer configuration is sealant/bulk/tie/EVOH/tie/bulk/outer.

The coex substrate film is in one embodiment about 2.5 mils thick, i.e. about 63.5 micrometers.

In one embodiment, as exemplified in FIG. 3, for example, the support web 50 comprises an optionally trap-printed (reverse printed) PET (polyester) support film, e.g. OPET (oriented polyethylene terephthalate) film, that is adhered to the outer layer of the substrate film (i.e. that layer of the substrate film furthest from the product) by an adhesive 41 e.g. a permanent polyurethane adhesive. The printed OPET film and adhesive 41 is in total, in one embodiment, about 0.5 mils (12.7 micrometers) thick. In one embodiment, the shaped die-cut 70 is a U-shaped die-cut.

In one embodiment, the label 60 comprises a BOPP (biaxially oriented polypropylene) film to which a pressure sensitive adhesive (PSA) is applied, e.g. by coating, on one surface thereof. The label is adhered to the support web at its upper surface (the surface furthest away from the substrate film), by means of the PSA, so as to cover the die-cut. The label covers more than the area defined by the die-cut, but less than the overall dimensions of the underlying support web. The label is in one embodiment 3.3 mils (89 micrometers) thick.

One end of the label 60 has an area that effectively functions as a pull tab 80. A product 16 such as a food product such as deli meat, Italian dry-cured meat, or other smoked and processed meat, or cheese, is contained in the package is illustrated in FIG. 1.

FIG. 2 illustrates that to open the package, e.g. by the consumer, pull tab 80 is pulled away from the package, lifting the label 60 as well as the portion of the laminate 30 (substrate film and support web) defined by the shaped die-cut 70. This leaves a marginal area around the label where the PSA 59 is exposed. After the package is opened, and the desired product 16 is removed, the label 60 can be laid back down on the top of the laminate 30 to reclose the package 12.

Any suitable vacuum skin packaging systems can be used in accordance with the invention for packaging of food products, or other products.

EXAMPLES

1. Material

The bottom web for use in accordance with the invention includes (a) a substrate film, (b) a printed support web, and (c) a label film. Resins for these films are identified in Table 1.

AB1 is an antiblock masterbatch blend of about 90% low density polyethylene and about 10% colloidal silica.

AD1 is a maleic anhydride grafted linear low density polyethylene that acts as a polymeric adhesive (tie layer material). It has a density of 0.916 grams/cc.

AD2 is a lamination adhesive such as polyurethane.

AD3 is a pressure sensitive adhesive.

AD4 is a maleic anhydride grafted linear low density polyethylene that acts as a polymeric adhesive (tie layer material). It has a density of 0.930 grams/cc.

AD5 is a maleic anhydride grafted linear low density polyethylene that acts as a polymeric adhesive (tie layer material).

OB1 is an ethylene/vinyl alcohol copolymer (EVOH) with about 38 mole % ethylene.

OB2 is an ethylene/vinyl alcohol copolymer (EVOH) with about 44 mole % ethylene.

TABLE 1

Resins for Bottom Web

| Material Code | Tradename or Designation | Source(s) |
|---|---|---|
| AB1 | 10,075ACP ™ Syloid ™ Concentrate | Teknor Color |
| AD1 | BYNEL ™4157 ™ | DuPont |
| AD2 | — | — |
| AD3 | — | — |
| AD4 | BYNEL ™4125 ™ | DuPont |
| AD5 | OREVAC ™ GREF PE 18300 NB SA PE 25 ™ | Arkema |
| OB1 | EVAL ™ H171B | EVALCA/Kuraray |
| OB2 | EVAL ™ E171B | EVALCA/Kuraray |
| OB3 | EVAL ™ F101B | EVALCA/Kuraray |
| PE1 | DOWLEX ™ 2070G ™ | Dow |
| PE2 | AFFINITY ™ PL 1881G ™ | Dow |
| PE3 | LDPE 611A ™ | Dow |
| PE4 | EXCEED ™ 4518PA ™ | ExxonMobil |
| PE5 | ELVAX ™ 3165 | DuPont |
| PE6 | T60-500-119 ™ | Ineos |
| PE7 | LD259 ™ | ExxonMobil |
| PE8 | LD158BW ™ | ExxonMobil |
| PE9 | ESCORENE ™ ULTRA FL00119 ™ | ExxonMobil |
| PE10 | RIGIDEX ™ HD6070FA ™ | Ineos |
| PE11 | SURLYN ™1702 ™ | DuPont |
| PE12 | ELVAX ™ 3170 | DuPont |
| PE13 | SURLYN ™1601 ™ | DuPont |
| PE14 | ELVAX ™ 3165 | DuPont |
| PET1 | MYLAR ™ 822 ™ | DuPont |
| PP1 | — | — |
| SL1 | 10002-12 SLIP ™ | Colortech |
| SL2 | CONPOL ™20S2 ™ | DuPont |

OB3 is an ethylene/vinyl alcohol copolymer (EVOH) with about 32 mole % ethylene.
PE1 is a Ziegler/Natta catalyzed ethylene/octene copolymer (LLDPE) with a density of 0.922 grams/cc.
PE2 is a branched, single-site catalyzed ethylene/octene copolymer (VLDPE) with a density of about 0.904 grams/cubic centimeter.
PE3 is LDPE.
PE4 is a single-site catalyzed ethylene/hexene copolymer (LLDPE) with a density of about 0.918 grams/cubic centimeter.
PE5 is an EVA with a comonomer content of about 18% by weight of EVA.
PE6 is an HDPE with a density of about 0.961 grams/cubic centimeter.
PE7 is LDPE.
PE8 is LDPE.
PE9 is an EVA with a comonomer content of about 19% by weight of EVA.
PE10 is an HDPE with a density of about 0.960 grams/cubic centimeter.
PE11 is an ionomer resin (a zinc neutralized ethylene/methacrylic acid copolymer.
PE12 is an EVA with a comonomer content of about 18% by weight of EVA.
PE13 is an ionomer resin (a sodium neutralized ethylene/methacrylic acid copolymer.
PE14 is an EVA with a comonomer content of about 18% by weight of EVA.
PET1 is a chemically-coated biaxially oriented polyethylene terephthalate.
PP1 is a biaxially oriented polypropylene.
SL1 is a masterbatch including about 95% of a carrier resin of LLDPE with about 5% oleamide, each component by weight of the masterbatch.
SL2 is a masterbatch including an amidic wax in a carrier resin of ethylene/methacrylic acid copolymer.

Compositional percentages herein are by weight, unless indicated otherwise.

A. Substrate Film 40

Figure 4:
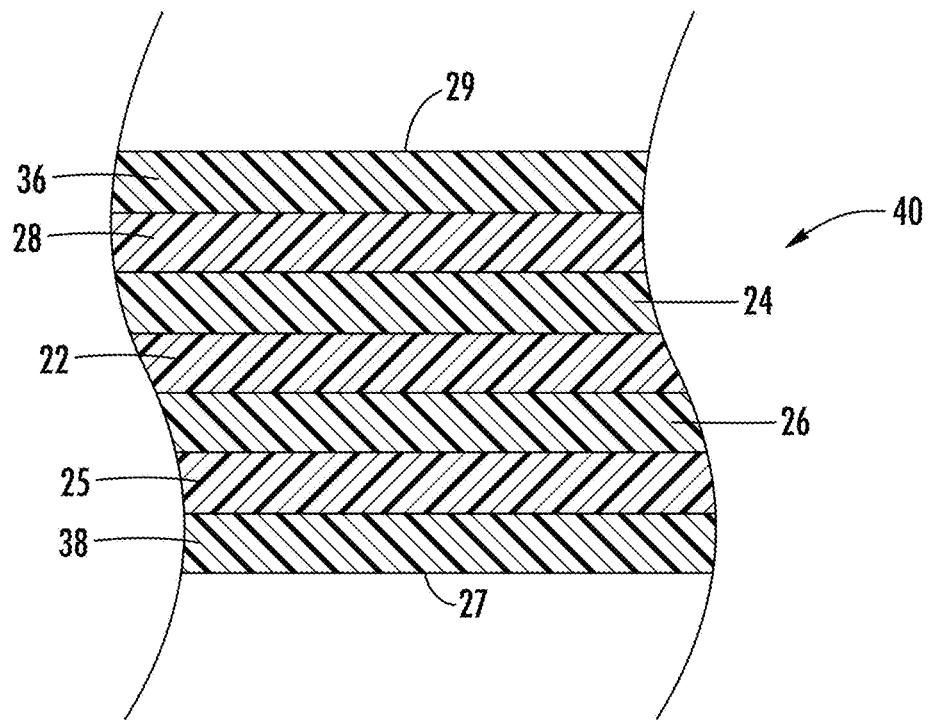
FIG. 4 is a cross-sectional view of a substrate film that comprises part of the bottom web.

A representative film structure suitable for use as the substrate film 40 in accordance with the invention is shown in FIG. 4.

In one embodiment, this film has the composition shown in Table 2.

Example 1 as shown has a total thickness of about 2.5 mils.

FIG. 4 is a cross-sectional view of a substrate film that comprises part of the bottom web. More generally, core layer 22 of the above film structure can comprise any suitable oxygen barrier material, such as EVOH, and can be blended in any suitable proportion with other polymeric materials or organic or inorganic additives as desired.

TABLE 2

Substrate Film

| Layer | Composition |
|---|---|
| 36 | 79% PE1 + 20% PE2 + 1% SL1 |
| 28 | 100% PE1 |
| 24 | 100% AD1 |
| 22 | 100% OB1 |
| 26 | 100% AD1 |
| 25 | 100% PE1 |
| 38 | 100% PE3 |

Tie layers 24 and 26 can comprise any suitable polymeric adhesive that functions to bond two layers together, e.g. EVA, and any of EVA, EAO, polypropylene, LDPE, ethylene/methyl acrylate copolymer, or ethylene/methyl acrylate copolymer to which a maleic anhydride has been grafted. Tie layers 24 and 26 can be the same, or can differ.

Bulk layers 25 and 28 can comprise any suitable polyolefin, such as an EAO, and/or a polymeric adhesive such as those disclosed herein for tie layers 24 and 26. Bulk layers 25 and 28 can be the same, or can differ.

Figure 7:
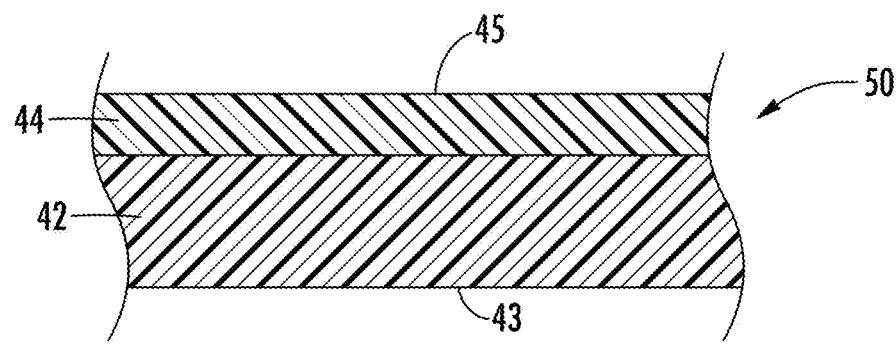
FIG. 7 is a cross-sectional view of a support web that comprises part of the bottom web.
Figure 8:
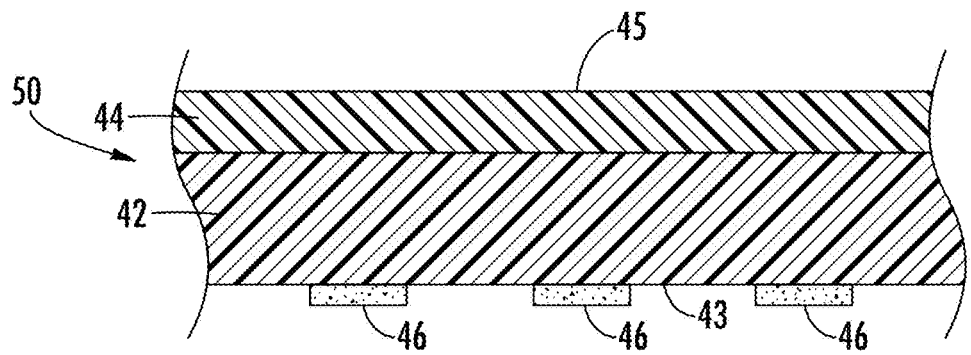
FIG. 8 is a cross-sectional view of the support web of FIG. 7, but also including a reverse print feature on a first surface of the support web.

Outer layer 36 functions as an outer laminating layer of the film, and provides a surface 29 to which a support web 50 can be laminated by means of an adhesive such as AD2 as shown in FIG. 7 and FIG. 8. This layer can comprise any suitable material, including one or more of polyamide, polyester, or polyolefin.

Inner layer 38 functions as a sealant layer of the film, and provides a surface 27 onto which a product can be disposed, and to which a thermoformable top web can be sealed, e.g. by heat sealing, or adhered. Layer 38 comprises one or more olefinic polymers.

Additional materials can optionally be incorporated into one or more of the film layers, including an antiblock agent, slip agent, antifog agent, filler, pigment, dyestuff, antioxidant, stabilizer, processing aid, plasticizer, fire retardant, UV absorber, etc.

The substrate film 40, and the layers thereof, can have any total thickness desired, so long as the film provides the desired properties for the particular packaging application in which the film is used. Typical total film thicknesses are from 0.5 mils to 15 mils, such as 2.5 mils; 3.0, 3.5, 4.0, 4.5, 5.0, and 6.0 mils.

Figure 5:
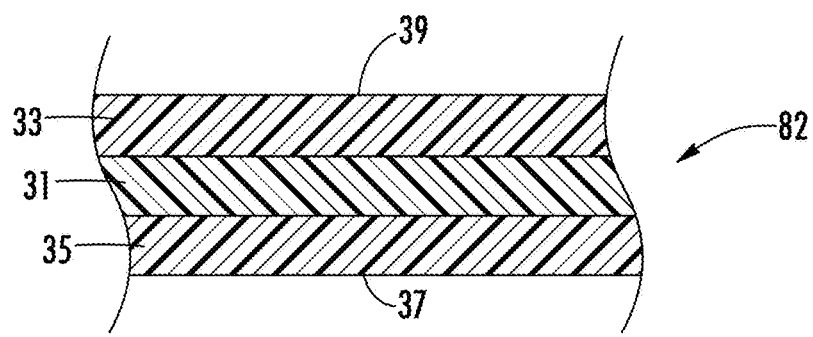
FIG. 5 is a cross-sectional view of another embodiment of a substrate film that comprises part of the bottom web.

Substrate film 40 can have any suitable number of layers, as long as a sealant layer is present, to provide a layer sealable to a top web, and an outer layer is present that functions as a surface to which the support web 50 can be laminated. FIG. 5 is a cross-sectional view of another embodiment of a substrate film that comprises part of the bottom web. In an embodiment, a three layer substrate film 82 includes an oxygen barrier layer 31 sandwiched between an outer layer 33, that can function as a laminating layer by providing a surface 39 to which a support web 50 can be laminated, and a sealant layer 35 that provides a surface 37 onto which a product can be disposed, and to which a thermoformable top web can be sealed, e.g. by heat sealing, or adhered.

Figure 6:
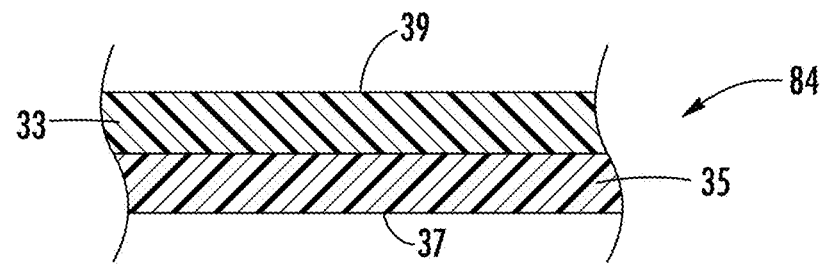
FIG. 6 is a cross-sectional view of another embodiment of a substrate film that comprises part of the bottom web.

FIG. 6 shows a cross-sectional view of another embodiment of a substrate film that comprises part of the bottom web. An oxygen barrier layer is not present, provided that the support web, discussed in more detail below, includes a coating or layer that comprises an oxygen barrier. In yet another embodiment, a substrate film 84 can be used in combination with a support web that does not have an oxygen barrier, where a high oxygen barrier is not required.

Thus, in various embodiments, either or both the substrate film and support web can include an oxygen barrier, or for some applications, neither of the substrate film and support web include an oxygen barrier.

B. Support Web 50

A representative film structure suitable for use as the support web 50 in accordance with embodiments of the invention is shown in FIG. 7 and FIG. 8. In one embodiment, a support web 50 is provided by applying a saran (polyvinylidene chloride (PVDC), vinylidene chloride/methyl acrylate copolymer, or vinylidene chloride/vinyl chloride copolymer) coating 44 to a support layer 42. Support layer 42 comprises a material such as polyester such as biaxially oriented PET (BOPET), polyamide such as biaxially oriented polyamide (BOPA), or polyolefin such as biaxially oriented polypropylene (BOPP). A commercial example of such film is MYLAR™ 34 from DuPont. This film is a monolayer PET film coated on one surface with saran.

In embodiments where a saran or other oxygen barrier is used in connection with the support web, the saran can be applied to the outer surface 45 or the inner surface 43 of the support web 50.

In another embodiment, the oxygen barrier layer of support web 50 is not necessary, provided the substrate film 40 includes a coating or layer that comprises an oxygen barrier. In yet another embodiment, neither the support web nor the substrate film has an oxygen barrier as described.

C. Label 60

In one embodiment, the label 60 comprises a such as polyester such as biaxially oriented PET (BOPET), polyamide such as biaxially oriented polyamide (BOPA), or polyolefin such as biaxially oriented polypropylene (BOPP). In some embodiments it may be desirable to construct label 60 from a material that is printable. A pressure sensitive adhesive (PSA) is applied, e.g. by coating, on one surface thereof to provide layer 59. The label is smaller in dimension than the underlying laminate. The label is adhered to the support web at its upper surface (the surface furthest away from the substrate film), by means of the PSA, so as to cover the die-cut. The label covers more than the area defined by the die-cut, but less than the overall dimensions of the underlying support web. The label is in one embodiment 3.3 mils (89 micrometers) thick.

One end of the label has an area that effectively functions as a pull tab 80. In this area, the PSA is either absent, or else "masked" during production, so that there is little or no adhesion in the pull tab area between the label and the underlying support web. Although the pull tab 80 is illustrated in FIG. 2 as centrally located along the longitudinal center axis of the bottom web and label, pull tab 80 can be disposed in an alternative location, e.g. at a corner or shoulder of label 60.

The label can optionally include a tamper-evident feature. As an example, the label can have, in each of two corners or "shoulders" of the label at the pull tab 80 "end" of the label, a tamper evident feature in the form of a printed colored circle with a relevant word such as "tamper" in a contrasting color, surface-printed on the label; and can in one embodiment additionally have, underlying each of the two white colored circles, a series of small, short, parallel die-cuts arranged in a staggered manner on the label. When the package is opened, each of the two printed controlled circles are ruptured into two segments, each segment remaining on its respective portion of the label surface, as a visual indication that the package has been initially opened. A small segment of the label, with a portion of the printed circle, remains adhered to the underlying laminate in the location at each of the two corners or shoulders of the label.

D. Printed Embodiments

In one embodiment, any or all of the substrate film 40, support web 50, or label 60 can be printed. Printed indicia, if present, can be of any suitable type or pattern, or ink composition. Any suitable printing technique can be used, such as rotary screen, gravure, or flexographic techniques. The printed indicia can be disposed on any or all of the outer surface (29, 39) of the outer laminating layer (36, 33) of substrate film 40, the inner surface 43 of support web 50 (see printed indicia 46 in FIG. 8), on the outer surface of layer 42 of the support web 50, on the surface 13 that is the outside surface of label 60 and functions as part of the bottom of the package, and the inner surface of label 60 to which the PSA layer 59 is applied. The printability of the particular substrate film, support web, and label used will be a significant factor in deciding where to install printed indicia. The printed indicia can be informational in nature, decorative in nature, or both.

E. Top Web 14

Any suitable thermoformable material can be used as a top web 14 in accordance with the invention. An example is VS836HB, a thermoformable, coextruded multilayer film available from Sealed Air Corporation, and having the layer construction (layer gauge in mils) as follows: 95% PE4+5% AB1/PE5/AD4/OB2/AD4/PE5/PE6 (0.47/1.88/0.47/0.52/0.47/1.80/0.39). The first layer of PE4+AB1 is a sealant layer that in the finished package will be in contact with the packaged product and in sealing relationship with the sealant layer 27,37 of the substrate film 40,82,84. This first layer comprises one or more olefinic polymers. The top web 14 can have any suitable total thickness, and number of layers. In this example, the top web has a total thickness of 6.0 mils and seven layers. Each layer can have any suitable thickness; thicknesses for each of the layers of the above example are shown in mils.

The core layer of the above film structure comprises EVOH, but can comprise any suitable oxygen barrier material.

Tie layers AD4 comprise a maleic anhydride-grafted olefinic material, but can comprise any suitable polymeric adhesive.

Bulk layers PE5 comprise a polyethylene, but can comprise any suitable polyolefin.

Outer layer PE6 functions as an outer layer of the top web, and defines the top 15 of the package 10.

Inner layer 38 functions as a sealant layer of the film, and provides a surface 27 onto which a product can be disposed, and to which a thermoformable top web can be sealed, e.g. by heat sealing, or adhered. Layer 38 comprises one or more olefinic polymers.

Other commercial examples of a thermoformable material that can be used as a top web 14 in accordance with the invention can be found in Table 3, each available from Sealed Air Corporation, include TS201, TC201, TH300, TH301, and TS270.

TABLE 3

Top Web Thermoformable Materials

TS201 Layer Construction with Layer Gauge (mils)

| PE7 | PE8 | PE9 | AD5 | OB3 | AD5 | PE9 | PE8 | PE10 |
|---|---|---|---|---|---|---|---|---|
| 0.24 | 0.55 | 0.75 | 0.12 | 0.31 | 0.12 | 0.43 | 1.02 | 0.39 |

TC201 Layer Construction with Layer Gauge (mils)

| 90% PE11 + 10% SL2 | PE8 | PE9 | AD5 | OB3 | AD5 | PE9 | PE8 | PE10 |
|---|---|---|---|---|---|---|---|---|
| 0.24 | 0.55 | 0.75 | 0.12 | 0.31 | 0.12 | 0.43 | 1.02 | 0.39 |

TH300 Layer Construction with Layer Gauge (mils)

| PE7 | PE12 | PE9 | AD5 | OB3 | AD5 | PE9 | PE10 |
|---|---|---|---|---|---|---|---|
| 0.51 | 0.31 | 1.50 | 0.12 | 0.31 | 0.12 | 2.32 | 0.71 |

TH300 Layer Construction with Layer Gauge (mils)

| PE11 | PE12 | PE13 | AD5 | OB3 | AD5 | PE13 | PE10 |
|---|---|---|---|---|---|---|---|
| 0.47 | 0.28 | 1.26 | 0.10 | 0.28 | 0.10 | 2.05 | 0.59 |

TH270 Layer Construction with Layer Gauge (mils)

| PE7 | PE12 | PE14 | PE8 | AD5 | PE8 | AD5 | PE8 | PE14 | PE10 |
|---|---|---|---|---|---|---|---|---|---|
| 0.35 | 0.20 | 0.35 | 0.63 | 0.12 | 0.28 | 0.12 | 0.35 | 1.06 | 0.47 |

Each of these is a coextruded film having a layer construction and layer gauge, in mils, as indicated in the following table. In each case, the material in the first (leftmost) column typically functions as a food contact layer, and would be the material that in connection with the present invention would be sealed to the sealant layer of the substrate film, e.g. layer 38 of substrate film 40, and would contact product 16 in the VSP process.

In a typical VSP package, a secondary seal is made between the VSP heated thermoformed web and the bottom web, support, or tray. This involves film-to-film contact that forms a tack seal in intermediate areas of the package where the packaged product is not present. In the present invention, in some embodiments, product 16 may not fully cover die-cut 70; that is, some of die-cut 70 may be in direct contact with the thermoformed top web 14. This can result in a secondary seal between a certain portion of the area of the bottom web in which die-cut 70 is disposed, and top web 14. This in turn can result in a more difficult opening of the bottom web, via the mechanism disclosed herein. One solution to ameliorate undue difficulty in opening the package is the use a top web 14 with an easy-open functionality. This functionality can be imparted using a coating, or a sealant extruded layer, that creates a secondary seal that is easily opened.

2. Method of Making Laminate 30

Substrate film 40 can be made by any suitable process, including coextrusion, extrusion coating, extrusion lamination, and conventional lamination using polyurethane or other adhesive 41. Extrusion can be done in annular or flat dies. The extrudate can be hot blown or cast, and optionally solid-state oriented as desired; one or more layers of the webs can optionally be chemically or electronically cross-linked. Likewise, the support web 50 can be made by any suitable process. Printed indicia, if present, can be applied as described herein. Substrate film 40 and support web 50 are brought together, e.g. through nip rolls or other suitable means, such that an adhesive 41 such as polyurethane is disposed between them and adheres them together. The result is laminate 30. Shaped die-cut 70 can be made by any suitable conventional process. The pattern of the die-cut is in one embodiment U-shaped, but any suitable pattern can be used, as long as it serves the function of providing an easy open/reclosable package in which the packaged product can be accessed by means of a flap created by the die-cut. Alternative patterns include triangular, three side rectangle, hour glass, and other shapes. Die-cut 70 can be made in laminate 30 after substrate 40 and support web 50 are laminated together. Further details regarding processes and techniques for laminating films together, including the handling of adhesives and production of die cuts, can be found in U.S. Pat. No. 7,681,732 (Moehlenbrock), incorporated herein by reference in its entirety.

Statement of Embodiments of the Invention

The present application is directed in various embodiments to the subject matter described in the following paragraphs. These are embodiments of any of the first (package) and second (method) aspects of the invention as described hereinabove in the Summary of the Invention. For each aspect, these features can be incorporated alone or in any suitable combination:

a) the laminate comprises a substrate film comprising an outer laminating layer comprising a thermoplastic material, the outer laminating layer having an outer surface, and an inner sealant layer comprising a thermoplastic material, the inner sealant layer having a surface which can be sealed to the top web; a support web comprising having an outer surface and an inner surface, comprising a thermoplastic material selected from polyester, polyamide, and polyolefin; and an adhesive disposed between the substrate film and the support web, and adhering the outer surface of the outer laminating layer of the substrate film to the inner surface of the support web; the shaped die-cut disposed in the substrate film and the support web;

b) at least one of substrate film and the support web comprises an oxygen barrier having an oxygen permeability, of the barrier material, less than 50 cm$^3$ O$_2$/m$^2$·day·atmosphere measured at a thickness of 1 mil (ASTM D 3985);

c) the substrate film comprises a core layer comprising ethylene/vinyl alcohol copolymer; two tie layers, each layer positioned on a respective surface of the core layer, comprising a polymeric adhesive; two bulk layers, each layer positioned on a surface of a respective tie layer, comprising polyolefin; an outer laminating layer comprising a material selected from polyamide, polyester, or polyolefin; and an inner sealant layer comprising an olefinic polymer; d) the substrate film further comprises two intermediate layers, each positioned between a respective tie layer and the core layer, comprising polyamide;

e) the support web comprises a material selected from biaxially oriented polyethylene terephthalate, biaxially oriented polyamide, and biaxially oriented polypropylene;

f) the shaped die-cut is a U-shaped die-cut;

g) the label comprises a first layer comprising a material selected from biaxially oriented polyethylene terephthalate, biaxially oriented polyamide, and biaxially oriented polypropylene; and a second layer adhered to the first layer, and comprising a pressure sensitive adhesive;

h) a portion of the first layer of the label comprises a pull tab;

i) the label comprises a printed surface;
j) the support web comprises a coating, adhered to the outer surface of the support web, comprising an oxygen barrier material; and
k) the top web comprises a coextruded multilayer film.

What is claimed is:

1. An easy-open/reclosable vacuum skin package comprising:
   a) a bottom web;
   b) a product disposed on the bottom web; and
   c) a top web in contact with and conformed to a shape of at least a portion of the product,
   wherein the bottom web comprises
      i) a laminate having a shaped die-cut; the laminate comprises:
         a. a substrate film comprising
            a single core layer comprising ethylene/vinyl alcohol copolymer having two respective surfaces;
            two tie layers, each tie layer being a single tie layer positioned directly on each of the respective surface of the core layer, comprising a polymeric adhesive;
            two bulk layers, each bulk layer positioned directly on a surface of a respective tie layer, comprising polyolefin
            an outer laminating layer comprising a thermoplastic material selected from polyamide, polyester, or polyolefin, the outer laminating layer having an outer surface; and
            an inner sealant layer comprising an olefinic polymer, the inner sealant layer having a surface sealed to the top web;
         b. a support web comprising having an outer surface and an inner surface, comprising a thermoplastic material selected from polyester, polyamide, and polyolefin;
         c. an adhesive disposed between the substrate film and the support web, and adhering the outer surface of the outer laminating layer of the substrate film to the inner surface of the support web; and
         d. the shaped die-cut disposed in the substrate film and the support web; and
      ii) a label overlying the shaped die-cut, and adhered to the laminate, the package configured such that when the label is peeled back, a portion of the laminate is also peeled back, opening the package, and the package can thereafter be reclosed by returning the label to substantially its original position on the laminate.

2. The easy-open/reclosable vacuum skin package of claim 1, wherein at least one of the substrate film and the support web comprises an oxygen barrier having an oxygen permeability less than 50 cm$^3$ O$_2$/m$^2$·day·atmosphere measured at a thickness of 1 mil (ASTM D 3985).

3. The easy-open/reclosable vacuum skin package of claim 1, wherein the support web comprises a material selected from biaxially oriented polyethylene terephthalate, biaxially oriented polyamide, and biaxially oriented polypropylene.

4. The easy-open/reclosable vacuum skin package of claim 1, wherein the shaped die-cut is a U-shaped die-cut.

5. The easy-open/reclosable vacuum skin package of claim 1, wherein the label comprises:
   a) a first layer comprising a material selected from biaxially oriented polyethylene terephthalate, biaxially oriented polyamide, and biaxially oriented polypropylene; and
   b) a second layer adhered to the first layer, and comprising a pressure sensitive adhesive.

6. The easy-open/reclosable vacuum skin package of claim 5, wherein a portion of the first layer comprises a pull tab.

7. The easy-open/reclosable vacuum skin package of claim 1, wherein the label comprises a printed surface.

8. The easy-open/reclosable vacuum skin package of claim 1, wherein the label is 3.3 mils thick.

9. The easy-open/reclosable vacuum skin package of claim 1, wherein the label includes a printed tamper-evident feature.

10. A method of making an easy-open/reclosable vacuum skin package comprising:
    a) providing a bottom web;
    b) disposing a product on the bottom web;
    c) providing a thermoformable top web; and
    d) advancing the product through a vacuum skin packaging process to make a package in which the top web is in contact with and conformed to the shape of at least a portion of the product;
    wherein the bottom web comprises a laminate having a shaped die-cut, and a label overlies the shaped die-cut, and is adhered to the laminate; the package configured such that when the label is peeled back, a portion of the laminate is also peeled back, opening the package, and the package can thereafter be reclosed by returning the label to substantially its original position on the laminate; wherein the laminate comprises:
    a) a substrate film comprising
        i) a single core layer comprising ethylene/vinyl alcohol copolymer;
        ii) two tie layers, each tie layer being a single tie layer positioned directly on a respective surface of the core layer, comprising a polymeric adhesive;
        iii) two bulk layers, each bulk layer positioned directly on a surface of a respective tie layer, comprising polyolefin
        iv) an outer laminating layer comprising a thermoplastic material material selected from polyamide, polyester, or polyolefin, the outer laminating layer having an outer surface;
        v) an inner sealant layer comprising an olefinic polymer, the inner layer having a surface sealed to the top web;
    b) a support web comprising having an outer surface and an inner surface, comprising a thermoplastic material selected from polyester, polyamide, and polyolefin; and
    c) an adhesive disposed between the substrate film and the support web, and adhering the outer surface of the outer laminating layer of the substrate film to the inner surface of the support web,
    the shaped die-cut disposed in the substrate film and the support web.

11. The method of claim 10, wherein at least one of the substrate film and the support web comprises an oxygen barrier having an oxygen permeability less than 50 cm$^3$ O$_2$/m$^2$·day·atmosphere measured at a thickness of 1 mil (ASTM D 3985).

12. The method of claim 10, wherein the support web comprises a material selected from biaxially oriented polyethylene terephthalate, biaxially oriented polyamide, and biaxially oriented polypropylene.

13. The method of claim 10, wherein the shaped die-cut is a U-shaped die-cut.

14. The method of claim 10, wherein the label comprises:
a) a first layer comprising a material selected from biaxially oriented polyethylene terephthalate, biaxially oriented polyamide, and biaxially oriented polypropylene; and
b) a second layer adhered to the first layer, and comprising a pressure sensitive adhesive.

15. The method of claim 14, wherein a portion of the first layer comprises a pull tab.

16. The method of claim 10, wherein the label comprises a printed surface.

\* \* \* \* \*